United States Patent
Adamse et al.

(10) Patent No.: US 9,132,591 B2
(45) Date of Patent: Sep. 15, 2015

(54) FIBRE REINFORCED COMPOSITE MOULDING

(75) Inventors: Yara Millaray Borja Adamse, Leonding (AT); Jean Claude Dumolard, Saint Entienne des Ouillieres (FR); Flemming Larsen, Christianfeld (DK); Manfred Schoeflinger, Linz (AT)

(73) Assignee: Hexcel Holding GMBH, Pasching (AT)

( * ) Notice: Subject to any disclaimer, the term of this patent is extended or adjusted under 35 U.S.C. 154(b) by 186 days.

(21) Appl. No.: 13/807,051

(22) PCT Filed: Jul. 1, 2011

(86) PCT No.: PCT/EP2011/003260
§ 371 (c)(1),
(2), (4) Date: May 16, 2013

(87) PCT Pub. No.: WO2012/000678
PCT Pub. Date: Jan. 5, 2012

(65) Prior Publication Data
US 2013/0287589 A1    Oct. 31, 2013

(30) Foreign Application Priority Data

Jul. 2, 2010 (AT) ................................ A 1131/2010
May 20, 2011 (AT) ................................ A 734/2011
May 20, 2011 (AT) ................................ A 735/2011
May 20, 2011 (GB) .................................. 1108552.9

(51) Int. Cl.
*B29C 70/44* (2006.01)
*B29C 70/48* (2006.01)
(Continued)

(52) U.S. Cl.
CPC ............. *B29C 70/48* (2013.01); *B29C 70/08* (2013.01); *B29C 70/443* (2013.01);
(Continued)

(58) Field of Classification Search
CPC .............. B29C 70/443; B29C 70/08; B29C 2045/14327; B29C 70/547; B29C 70/546
USPC ........................................................ 264/258
See application file for complete search history.

(56) References Cited

U.S. PATENT DOCUMENTS 2,913,036 A * 11/1959 Smith ........................ 264/102
4,758,395 A *  7/1988 Zion .......................... 264/135
(Continued)

FOREIGN PATENT DOCUMENTS

EP        0722826      8/2003
EP        2153964      2/2010
(Continued)

OTHER PUBLICATIONS

Kaps, R., L. Herbeck, A. Herrmann, Hybrid Fabrication Route—Cost Efficient CFRP Primary Airframe Structures, 25th International Congress of the Aeronautical Sciences (2006), pp. 1-11.*

*Primary Examiner* — Matthew Daniels
(74) *Attorney, Agent, or Firm* — W. Mark Bielawski; David J. Oldenkamp

(57) ABSTRACT

The present invention regards a fiber-reinforced composite molding with an outer (102) structure and an inner structure (106), wherein the outer structure (102) is formed from at least one layer of fibrous reinforcing material and a cured first resin material, and the inner structure (106) is formed from a plurality of layers of fibrous reinforcing material and a second cured resin material, wherein the viscosity of the uncured first resin material is lower than the viscosity of the uncured second resin material and wherein in the composite molding the two cured resin materials are at least partially mixed with each other. It also regards a process for the production of such a fiber-reinforced composite molding.

20 Claims, 2 Drawing Sheets

Figure 1:
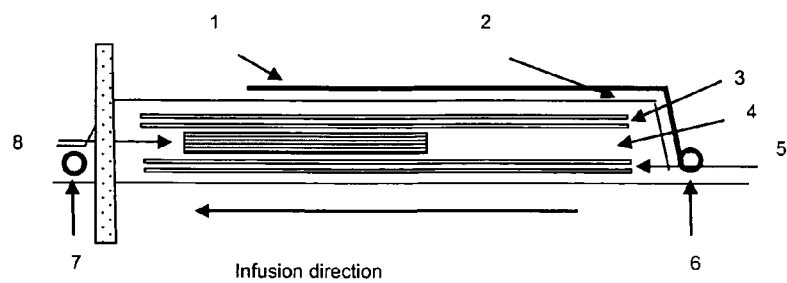

(51) Int. Cl.
  *B29C 70/54* (2006.01)
  *B29C 70/08* (2006.01)
  *B29D 99/00* (2010.01)
  *B32B 3/26* (2006.01)
  *B32B 5/22* (2006.01)
  *F03D 1/06* (2006.01)
  *B29C 45/14* (2006.01)
  *B29L 31/08* (2006.01)

(52) U.S. Cl.
  CPC ......... *B29C 70/546* (2013.01); *B29D 99/0025* (2013.01); *B32B 3/266* (2013.01); *B32B 5/22* (2013.01); *F03D 1/0675* (2013.01); *B29C 2045/14327* (2013.01); *B29L 2031/082* (2013.01); *F05B 2280/6003* (2013.01); *Y02E 10/721* (2013.01); *Y10T 428/24322* (2015.01); *Y10T 428/249921* (2015.04); *Y10T 442/60* (2015.04)

(56) References Cited

U.S. PATENT DOCUMENTS

| | | | | |
|---|---|---|---|---|
| 4,902,215 A | * | 2/1990 | Seemann, III | 425/406 |
| 5,567,499 A | * | 10/1996 | Cundiff et al. | 428/116 |
| 5,721,034 A | * | 2/1998 | Seemann et al. | 428/71 |
| 6,048,488 A | | 4/2000 | Fink | |
| 7,255,549 B2 | * | 8/2007 | Hadley | 425/129.1 |
| 7,419,627 B2 | | 9/2008 | Sheu et al. | |
| 7,727,449 B2 | * | 6/2010 | Lorenz et al. | 264/258 |
| 2002/0038923 A1 | * | 4/2002 | Lenherr | 264/221 |
| 2002/0121722 A1 | * | 9/2002 | Davies et al. | 264/129 |
| 2003/0019567 A1 | * | 1/2003 | Burpo et al. | 156/245 |
| 2007/0107220 A1 | * | 5/2007 | Bakhuis et al. | 29/889.7 |
| 2007/0251090 A1 | * | 11/2007 | Breugel et al. | 29/889.7 |
| 2008/0093761 A1 | * | 4/2008 | Hansen | 264/46.6 |
| 2009/0008836 A1 | | 1/2009 | Kaps et al. | |
| 2009/0051076 A1 | * | 2/2009 | Kofoed et al. | 264/258 |
| 2010/0062238 A1 | * | 3/2010 | Doyle et al. | 428/295.1 |
| 2010/0189973 A1 | * | 7/2010 | Mikkelsen et al. | 428/213 |
| 2010/0209651 A1 | * | 8/2010 | Mikkelsen et al. | 428/56 |
| 2011/0164987 A1 | * | 7/2011 | Grabau | 416/230 |
| 2012/0263600 A1 | * | 10/2012 | Grove-Nielsen | 416/223 R |

FOREIGN PATENT DOCUMENTS

| | | |
|---|---|---|
| GB | 2351937 | 1/2001 |
| WO | 2008119941 | 10/2008 |
| WO | 2008119942 | 10/2008 |

* cited by examiner

FIBRE REINFORCED COMPOSITE MOULDING

The present invention concerns a fibre-reinforced composite moulding with an outer structure and an inner structure, wherein the outer structure is formed from at least one layer of fibrous reinforcing material and a cured first resin material, and the inner structure is formed from a plurality of layers of fibrous reinforcing material and a second cured resin material. It also regards a process for the production of such a fibre-reinforced composite moulding.

Fibre-reinforced plastic (FRP) are composite materials made of a polymer matrix reinforced with fibres. The fibres can for instance be made of glass, carbon, kevlar, aramid, basalt (mineral) or be of organic origin, like cotton, hemp or flax, while the polymer of the matrix is usually an epoxy, vinylester, thermoplastic or polyester thermosetting plastic. FRPs are commonly used in the aerospace, automotive, marine, and construction industries.

Before being bonded to the matrix, the fibres are manufactured into fibre preforms, either as prepregs or as "dry" fibrous reinforcing material.

Prepreg is a term for "pre-impregnated" composite fibres. In a prepreg the fibrous reinforcement material is completely or partially impregnated with a reinforcement resin material. In this context of this application, prepreg also comprise fibrous reinforcement materials which are conjoined to a resin layer whereby the outer surface of the fibrous layer is dry to touch, contains no or a low level of resin impregnation, or is substantially untacky. Prepregs usually take the form of a weave or uni-directional and already contain an amount of the matrix material or resin material used to bond them together and to other components during manufacture. The prepregs are mostly stored in cooled areas since activation is most commonly done by heat. Hence, composite structures built of pre-pregs will mostly require an oven or autoclave to cure out.

"Dry" fibrous reinforcing material is often made in sheets, continuous mats, or continuous filaments for spray applications, mainly by way of the textile processing techniques of weaving, knitting, braiding and stitching.

Stitching is arguably the simplest of the four main textile manufacturing techniques. Basically the stitching process consists of inserting a needle, carrying the stitch thread, through a stack of fabric layers to form a 3D structure. With prepreg material stitching is normally not necessary since it already contains an amount of the matrix material used to bond them together and to other components during manufacture. Multiaxial prepregs are stitched, however, unidirectional prepreg material is typically non stitched.

Such fibrous reinforcing material and polymer material (or prepregs, respectively) are then put into their final shape by moulding. There are two distinct main categories of moulding processes using FRP plastics, namely composite moulding and wet moulding. Composite moulding uses prepregs, i.e. sheets or stacks of prepregs are heated or compressed in different ways to create geometric shapes. Wet moulding combines fibre reinforcement and the polymer matrix during the moulding process.

Of course there are more categories of moulding processes.

With bladder moulding, individual sheets of prepreg material are laid-up and placed in a female-style mould along with a balloon-like bladder. The mould is closed, placed in a heated press and the bladder is pressurized forcing the layers of material against the mould walls. The material is then cured and removed from the hot mould. Bladder moulding is a closed moulding process with a relatively short cure cycle between 15 and 60 minutes.

Compression moulding comprises that a "preform" or "charge", of SMC, BMC or sometimes prepreg fabric, is placed into a mould cavity. The mould is closed and the material is compacted and cured by pressure and heat.

Autoclave/vacuum bag moulding means that individual sheets of prepreg material are laid-up and placed in an open mould. The material is covered with release film, bleeder/breather material and a vacuum bag. A vacuum is pulled on part and the entire mould can additionally be placed into an autoclave. The material is cured with a continuous vacuum to extract entrapped gasses from the laminate. This is a very common process in the aerospace industry because it affords precise control over the moulding process due to a long slow cure cycle. This precise control creates the exact laminate geometric forms needed to ensure strength and safety.

Mandrel wrapping is another possibility, wherein sheets of prepreg material are wrapped around a steel or aluminium mandrel. The prepreg material is compacted by nylon or polypropylene cellotape, the parts are typically batch cured by hanging in an oven. After cure the cello and mandrel are removed leaving a hollow tube made of FRP material.

By wet layup fibre reinforcing fabric is placed in an open mould and then saturated with the polymer matrix material by pouring it over the fabric and working it into the fabric and mould. The mould is then left so that the resin will cure, usually at room temperature, though heat is sometimes used to ensure a proper curing process. Glass fibres are most commonly used for this process, the results are widely known as fibreglass, and is used to make common products like skis, canoes, kayaks and surf boards.

Further methods with more limited use are chopper guns, filament winding and pultrusion.

Of particular interest is RTM & VARTM, also called infusion techniques. Here, fabrics are placed into a mould into which readily flowable resin is then injected. In the RTM (Resin Transfer Molding) process the resin is typically pressurized and forced into a cavity which is under vacuum, whereas with the VARTM (Vacuum Assisted Resin Transfer Moulding) process resin is entirely pulled into cavity under vacuum. This latter moulding process allows precise tolerances and detailed shaping but can sometimes fail to fully saturate the fabric leading to weak spots in the final shape. Liquid Resin Film infusion (LRI) is another technique, which uses a resin film for infusion of the reinforcement layers. The film is heated, liquefies and thus penetrates the fibres of the reinforcement layers.

A fibre-reinforced plastic component is typically of a thin "shell" construction, sometimes filled on the inside with structural foam, as in the case of surfboards. The component may be of nearly arbitrary shape, limited only by the complexity and tolerances of the mould used for manufacturing the shell. Advanced manufacturing techniques such as prepregs and fiber rovings extend the applications and the tensile strength possible with fiber-reinforced plastics.

Use of FRP is of particular interest in wind turbine designs, but by no means limited thereto.

New generation wind turbine designs are pushing power generation from the single megawatt range to upwards of 10 megawatts, soon even more. The common trend of these larger capacity designs are larger and larger turbine blades. Current production wind turbine blades are manufactured as large as 125 meters in diameter with prototypes in the range of 150 to 200 meters.

One of the most important goals when designing larger blade systems is to keep blade weight under control. Since blade mass scales as the cube of the turbine radius, loading due to gravity becomes a constraining design factor for systems with larger blades.

Current manufacturing methods for blades in the 40 to 50 meter range involve various proven fiberglass composite fabrication techniques. Some manufactures use an infusion process for blade manufacture, others use variations on this technique, some including carbon and wood with fiberglass in an epoxy matrix. Options also include prepreg fiberglass and vacuum-assisted resin transfer molding. Essentially each of these options are variations on the same theme: a glass-fiber reinforced polymer composite constructed through various means with differing complexity. Perhaps the largest issue with more simplistic, open-mould, wet systems are the emissions associated with the volatile organics released into the atmosphere. Preimpregnated materials and resin infusion techniques avoid the release of volatiles by containing all reaction gases. However, these contained processes have their own challenges, namely the production of thick laminates necessary for structural components becomes more difficult. As the preform resin permeability dictates the maximum laminate thickness, bleeding is required to eliminate voids and insure proper resin distribution. A solution is shown e.g. in WO 2008/119941 A1, which discloses a method for manufacturing a fibre-reinforced composite component having an outer surface coating to provide an aesthetic and protective finish. A surface layer is placed in a mould and structural layers comprising structural dry fabric reinforcements are placed above the surfacing layer. A prepreg layer may be provided within or adjacent to at least one layer of fibrous reinforcing material of a surfacing layer. The prepreg layer comprises unidirectional fibres in the layer of a third resin material. The surfacing layer and the at least one layer of fibrous reinforcing material are disposed on a portion of the mould surface in a common step. The different resin materials of the surfacing layer and the at least one layer of fibrous reinforcing material are cured at least partially simultaneously in a curing step. It is assumed that during evacuation, the dry fabric provides a path for airflow and, once heat and pressure are applied, resin may flow into the dry region resulting in a thoroughly impregnated laminate structure.

Epoxy-based composites are of greatest interest to wind turbine manufacturers because they deliver a key combination of environmental, production, and cost advantages over other resin systems. Epoxies also improve wind turbine blade composite manufacture by allowing for shorter cure cycles, increased durability, and improved surface finish. Prepreg operations further improve cost-effective operations by reducing processing cycles, and therefore manufacturing time, over wet lay-up systems. As turbine blades are approaching 60 meters and greater, infusion techniques are becoming more prevalent as the traditional resin transfer moulding injection time is too long as compared to the resin set-up time, thus limiting laminate thickness. Injection forces resin through a thicker ply stack, thus depositing the resin where in the laminate structure before gelation occurs. Specialized epoxy resins have been developed to customize lifetimes and viscosity to tune resin performance in injection applications.

Recently, carbon fiber-reinforced load-bearing spars have also been identified as a cost-effective means for reducing weight and increasing stiffness. The use of carbon fibers in 60 meter turbine blades is estimated to result in a 38% reduction in total blade mass and a 14% decrease in cost as compared to a 100% fiberglass design. The use of carbon fibers has the added benefit of reducing the thickness of fiberglass laminate sections, further addressing the problems associated with resin wetting of thick lay-up sections.

US patent application US 2009/008836 A1 discloses a method of producing a joined-together fibre composite component with two regions that are mutually adjacent but constructed in different ways. The first region is prepared from a preform while the second region is prepared from a prepreg. The two regions have reinforced fibres embedded in a polymer matrix and a transitional film is arranged between them. The transitional film is vacuumtight and spatially separates the two regions but enters into permanent bonds with the matrices of the two regions by a thermal treating process. The patent application claims the benefit that the two regions can be prepared at different locations at different times. However, it has to be assumed that the two regions used different resins. For this reason, the transfer film is needed which allows for applying different strength of vacuum to the two regions which implies that also two vacuum bags are needed.

U.S. Pat. No. 7,419,627 B2 relates generally to the field of composites construction and in particular to a co-cured resin vacuum assisted transfer moulding manufacturing method.

GB 2,351,937 B discloses a process for production of a fibre reinforced plastic component. One part of the component is prefabricated as a prepreg semi-finished product while the other part is prefabricated as a textile semi-finished product which is made of carbon, glass or aramide fibres and is prefabricated by means of sewing, embroidering, braiding or weaving. A resin film is applied to the textile product which is placed together with the prepreg product in a curing device. The prepreg and the textile product are evacuated and cured together.

Document WO 2008/119941 A1 mentioned above discloses in principle the combination of a prepreg layer with dry fabric reinforcements but, as described, these layers are interleaved and the load carrying inner structure is at least partially built up from dry fabric reinforcements with all its disadvantages.

Especially the manufacture of wind turbine blades by way of infusion technologies are linked to a number of problems.

The first problem is related to comparably bad quality and poor reproducibility of inner structures of the blades manufactured by infusion technology. This leads to comparably poor mechanical properties of the infused inner structures.

The second problem is related to the fact that infusion of dry stitched unidirectional materials (hereinafter 'UD') for inner structures in fact is a bottleneck in throughput of blade manufacturing processes using infusion technology.

The third problem is related to production time and high cost of blade production in case manufacturing includes two process steps (e.g. if the inner and outer structure of blades are manufactured separately).

When two production steps are used in production of blades for wind turbines, long time of manufacture is necessary for big parts, two moulds instead of one are necessary, there is an increased capital cost for the extra mould and high energy and labour costs are involved.

When inner structures are produced by way of infusion technology, also the following problems have been identified:

There is poor control of the resin content as an inherent property of infusion technology, long infusion time especially for long and thick UD stacks of inner structures are needed, high variation of the resin content of infused parts occurs, resulting in deviations of final blades weights. Furthermore, there is low compaction in the infused parts due to the low vacuum at infused areas, a poor control of impregnation of resin inside the inner structure, generating potential dry spots, particularly inside thick parts which is difficult to detect visually. The above mentioned factors imply application of comparable high security factors resulting in increased blade weights (and material costs).

A layup of dry stitched UD plies in a manual way (what is usually applied to manufacture infused inner structures) does not allow any control of tension of rovings, tows or plies. In a multi-ply layup this effect will lead inevitably to misalignment, wrinkles and folds, a reduction of mechanical properties (especially compression and fatigue performance) of thick lay-ups used for today's large structures/blades. In the specific case of carbon UD, those problems are even more critical.

The invention aims to obviate and/or mitigate the above described problems and/or to provide improvements generally.

According to the invention, there is provided a moulding and a process as defined in any of one of the accompanying claims.

One aim of the present invention is to overcome the disadvantages of the state of the art mentioned above and to provide a fibre-reinforced composite moulding with an outer structure and an inner structure, wherein the outer structure is formed from at least one layer of fibrous reinforcing material and a cured first resin material, and the inner structure is formed from a plurality of layers of fibrous reinforcing material and a second cured resin material. According to the present invention this is accomplished in that the viscosity of the uncured first resin material is lower than the viscosity of the uncured second resin material and that in the composite moulding the two cured resin materials are at least partially mixed with each other. In other words, according to the present invention the outer structure, which normally provides an aesthetic and protective function, is made by infusion techniques using a resin with good flowability and the inner, load carrying structure is build up of prepregs, namely preferably UD layers impregnated with the second resin. Due to this unique build up, there is no need for resin to flow into dry regions of the inner structure since there are no dry regions in the inner structure, the inner structure is built up of prepregs. Use of UD prepreg instead of stitched and infused UD avoids wrinkles of fibers, thus the mechanical performance of the inner structure is much better than in case of stitched and infused UD materials. Additionally and next to or within the inner structure further load carrying elements and/or buckling preventing structures and elements can be included, e.g. elements made of foam, wood, light weight metal or composites.

In the context of this application the terms outer structure and inner structure merely distinguish one part of the moulding, assembly or build-up from another part of the moulding. Preferably, a part of the moulding on the inside of the moulding is the inner structure, whilst a part which is not present on the inside of the moulding is the outer structure as it is closer to or forms part of the exterior of the moulded part. The inner structure may comprise a core material or a core structure. The core material may be load carrying. The core material may be impermeable to the resin. The core material may comprise a foam or wood.

According to a preferred embodiment of the present invention, the outer structure additionally comprises an interlaminar flow medium. The interlaminar flow medium is adapted to remove air and volatiles from the moulding during processing and to receive the first resin to impregnate the interlaminar flow medium. The interlaminar flow medium is permeable to both the gas and the resin.

Such an interlaminar flow medium is preferably located on the lower side of the whole structure to be moulded and aids in having a complete infusion of the outer structure with the first resin material. It can be formed by a variety of means, e.g. a grid, continuous, chopped made fibre mat providing channels within the layer(s) of fibrous reinforcing material forming the outer structure. Object of the interlaminar flow medium is to provide for optimum flow of the resin (low viscosity resin for the outer structure) in flow critical areas, thus avoiding a possible air entrapment in the dry layers of fibrous reinforcing material of the outer structure and providing for an escape during infusion of the first resin.

A further preferred embodiment of the present invention is characterized in that the viscosity of the uncured first resin material is between 0.14 and 0.4 Pa·s and the viscosity of the uncured second resin material is between $0.7 \cdot 10^4$ and $8 \cdot 10^5$ Pa·s, both measured at 25° C. More specifically, the initial mix viscosity of the first (infusion) resin varied at 25° C. between 0.14 (ultra low viscosity resins) and 0.4 Pa·s, this resin immediately starting to cure and after 4 hours at 25° C. the viscosity would be about 6 to 10 Pa·s. The viscosity of the second resin used for the prepreg depends on the specific prepreg needed and, for some applications, could be varied at 25° C. from between $0.7 \cdot 10^4$ and $8 \cdot 10^5$ Pa·s. Resins used with the prepregs were M9.6F (from Hexcel, A T) with a viscosity of between 2.2 and $6.5 \cdot 10^4$, and M9.6LT (also from Hexcel, A T) with a viscosity of between 0.9 and $1.9 \cdot 10^5$ Pa·s. For example, for the infusion resin it is important to work with low viscosity to achieve a complete infusion, in the case of prepreg from the practical point of view a low tack is important. This low tack could be achieve using a high viscosity resin (M9.6LT or maybe better M19.6LT resin, same viscosity but lower reactivity, both from Hexcel A T) or for example using a prepreg (M9.6F or better M19.6 resin, same viscosity but lower reactivity, both from Hexcel A T) with some dry fleece in between, giving a prepreg dry to touch, making the layup easy and letting the air escape to achieve layups with low porosity. Furthermore, for instance M19.8 (from Hexcel A T) has an ultra high viscosity ($4-8 \cdot 10^5$ Pa·s) and should have an even lower reactivity. Regarding the interaction between infusion and prepreg resins, another important point is the compatibility between both resins, prepreg and infusion resin. Preferably in both cases epoxy resins are used, which are chemically compatible. In the case of prepreg resin, a low reactive resin should be chosen, especially if the curing cycle will be done in the infusion mould, in order to avoid high temperatures at the surface of the mould.

Preferably the outer structure comprises at least one layer of stitched or bonded fibrous reinforcing material. By this it is safeguarded that while UD-material can be used in the outer structure, the fibres of the fibrous reinforcing material are nevertheless safely held together prior to infusion with the first resin.

According to a further preferred embodiment of the present invention, the inner structure is made up of layers of unstitched, unbonded or nonwoven fibrous reinforcing material made from pre-preg. Utilizing prepreg in comparison to other known techniques like infusion utilizing stitched, bonded or woven fabrics, pre-preg safeguards enhanced mechanical properties due to the straight even and uniform fibre alignment solely obtained from the resin fixation of the fibres i.e. without need of stitching, bonding or weaving techniques. With the present invention it is possible to fabricate long scale composite parts, for instance wind energy blades, in one step and in one mould by combining prepreg and infusion technologies. Using this concept, inner structures will be made using prepreg and outer structures by using infusion technology. Both structures will be produced in the same mould and cured in one step.

Use of the technology of the present invention to manufacture long scale composite parts would among others result in savings in mould time, energy cost and capital costs (in case inner and outer structures have hitherto been manufactured in separate moulds). Compared to infused composite parts, infusion for the outer structure combined with the use of prepregs for the inner structures will fully utilise the benefits of prepreg materials which comprise:

- Excellent control of resin content, leading to improved consistency of composite part weights,
- Excellent reproducibility of the manufacturing processes of inner structures,
- Consistent high quality level of the inner, load bearing structures,
- Introduction of carbon UD into inner structures can be easily done at the same quality level as with glass UD,
- Exclusive use of prepregs in the inner structures will ensure constant and controlled resin content and resin distribution,
- The use of prepregs ensures that all fibres will be impregnated,
- It results in mechanical benefits in the inner structure originating from stretched, none stitched fibres as used in prepregs
- Further, positioning and securing the positioning by the tack during build up of thick inner structure lay-ups is ensured,
- In general, better mechanical performance, especially regarding compression strength, ILS and fatigue performance is given,
- There is the possibility to automate UD inner ply lay-up and positioning, thereby avoiding failure risks from manual processes.

When using the technology of the present invention, also no pre-consolidation time is necessary. The "Co-infusion" of prepregs, i.e. the simultaneous use of infusion technology for the outer structure and prepreg technology for the inner structure especially for long scale composite parts will result in significantly reduced infusion process time leading to higher mould output.

By the combined use of prepregs for the inner structure with the infusion technique for the outer structure, problems are solved which occur particularly in the production of long blades for wind turbines when both inner and outer structures are infused. This regards among others the alignment of fibers both due to infusion of the inner structure and to stitching, which is a big problem when using infusion technique, and results in inferior mechanical performance of the infused inner structures compared to ones according to the present invention. Furthermore, with the present invention it is also easier to control the exotherm, e.g. by using "low-exotherm" prepregs, and therefore also the time to produce the whole structure. As a result, the present invention also serves to improve productivity and quality control.

Another aim of the present invention is to provide a process for the production of the above mentioned fibre-reinforced composite moulding, which process comprises the following steps:

- placing at least one layer of fibrous reinforcing material on a mould surface to form at least part of the outer structure,
- placing a plurality of prepreg layers impregnated with a second resin material on at least a part of the outer structure to form an inner structure,
- covering the plurality of prepreg layers with at least one layer of fibrous reinforcing material to finish the outer structure,
- applying reduced pressure to the assembly,
- infusing, under reduced pressure, a flowable first resin material into the build up and
- simultaneously curing the first and the second resin material.

The process of the present invention is easy to perform and gives the benefit of quick infusion and also complete impregnation of the whole structure. The first resin material (which is used for infusion) does not have to go long ways to the inner structure of the moulding material (as in the embodiments of the state of the art), infusion takes place in the outer structure. The inner structure consists of prepregs known as such, no additional supply of a resin is necessary to provide for a complete impregnation on the inner structure. The prepregs are laid onto each other utilizing the tack from the resin to secure their position. Prepregs are also more or less similar to stiff sheets that via the resin tack once positioned secure straight ply and fibre position/orientation, i.e. prepregs are fully fixed after positioning and during vacuum application and thus avoid folds and wrinkles in the load carrying build up of the inner structure. Since the core forms the load carrying part of the whole moulding, it is especially important that the core has no voids in its structure. The resin materials should be compatible with each other, the prepreg resin normally being a slow resin while the infusion resin reacts quickly. All conventional types of resin or combinations of resins can be used, however, since they mix they should be compatible.

Preferably the process additionally comprises the step of applying an interlaminar flow medium during build up of the outer structure. By such a medium complete infusion of the outer structure is safeguarded since it provides means for air entrapped underneath the inner structure and within the outer structure to escape readily and completely.

According to a preferred embodiment of the present invention the process additionally comprises the step of applying load carrying core structures next to the inner structure. When using the process of the present invention, it is also possible to add foam bodies (or also bodies made of light wood, metal, carbon fibres etc.) as additional load carrying structures next to the prepreg inner structure. Such bodies will become part of the inner structure during curing, when both the first and the second resin material become flowable and at least partially mix with each other (infusion resin will migrate into the prepreg resin) to form a homogenous bonding matrix within the fibre-reinforced composite moulding.

Furthermore, it is preferred when the first and the second resin material are simultaneously cured at a temperature of between 70° C. and 140° C. during a time period of between 100 and 600 minutes, especially at a temperature of between 80° C. and 100° C. during a time period of between 120 and 480 minutes. These temperatures and time intervals give substantial improvements over the state of the art, curing according to the process of the present invention is faster and can be performed at lower temperatures then in conventional processes for infusion or prepreg technology. The above cure cycle is compatible for both resin materially, the maximal temperature due to the exothermic reaction of the prepregs of the inner structure shall not exceed the Tg of the mould surface.

A further preferred embodiment of the process according to the present invention is characterized in that 80% of the first resin material required for impregnation of the outer structure is infused within a time period of below 120 minutes. Also this is a substantial improvement over the state of the art processes, impregnation (infusion) of the outer structure can be done much faster than before.

According to another embodiment of the invention, there is provided a fibre-reinforced composite moulding or assembly having an outer structure and an inner structure, wherein the outer structure is formed from at least one layer of fibrous reinforcing material and a first resin material, and the inner structure is formed from a plurality of layers of resin impregnated fibrous reinforcing material or prepreg comprising a second resin material, wherein the moulding or assembly is configured for processing by infusion of a flowable first resin material into the moulding and curing the first and the second resin material. The first and second resin materials are preferably cured or partly cured simultaneously.

The moulding or assembly prior to curing is infused by the first resin which flows into the fibrous reinforcing material and subsequently the first and second resin material are cured.

The fibrous reinforcing material of the outer structure may be dry (unimpregnated) or partially impregnated with resin prior to infusion. The inner structure may comprise one or more layers of a cured resin impregnated fibrous reinforcement material or cured prepreg. In an advantageous embodiment, the inner structure comprises uncured and/or part cured or part processed resin preimpregnated fibrous layers (prepreg layers) in combination with uncured or unprocessed prepreg material.

An important advantage of including cured or part-cured resin impregnated fibrous layers is that this reduces the energy input which is required to process the moulding to cure. Also, this enables better control of the exothermic energy release during curing of the moulding which obviates the need for a cure schedule comprising multiple dwell stages during which the temperature is held constant for a period of time. This results in a faster processing time for curing the assembly or moulding.

In a preferred embodiment, during infusion firstly the first resin material infuses the outer structure below the inner structure before the outer structure above the prepreg layers is completely impregnated. The moulding may comprise a load carrying core structure, the core structure comprising apertures to enable visual identification of the location of the resin in the assembly.

According to a further embodiment of the invention, there is provided a process for the production of a fibre-reinforced composite moulding, comprising the following steps:
a) placing at least one layer of fibrous reinforcing material on a mould surface to form at least part of the outer structure,
b) placing a plurality of prepreg layers impregnated with a second resin material on at least a part of the outer structure to form an inner structure,
c) covering the plurality of prepreg layers with at least one layer of fibrous reinforcing material to finish the outer structure and to form a build up or assembly,
d) evacuating the assembly or extracting gases from the assembly,
e) infusing or injecting a flowable first resin material into the assembly and
f) curing the first and the second resin material, wherein step e) comprises a first infusion step and a subsequent second infusion step, in the first infusion step, the outer structure below the inner structure being infused before infusing the outer structure over the prepreg.

Step d) of the process may also comprise the step of applying a reduced pressure to the assembly. The first and the second resin material may be cured simultaneously. The resin may be infused or injected into the assembly to infuse or impregnate the outer structure.

Prior to infusion in step e) the process may comprise the step of providing a first resin flow point and a second resin flow point in relation to the build up, and providing a resin flow restriction between the resin flow points. The resin flow restriction may consist of a compression member which blocks the flow of resin through the outer structure in the location in which the compression member is applied. Typically, as the moulding is situated inside a flexible vacuum chamber or vacuum bag, the compression member may be formed by any member which is applied to the outer structure within the vacuum bag and which is compressed onto the outer structure upon evacuation of the moulding. This results in a local resin flow restriction. To control the flow of resin curing processing, the flow restriction may be removable.

In another embodiment, resin flow points are located in relation to the moulding. Resin flow points are points from which the resin may flow or to which the resin may flow. Resin flow points may thus be formed by evacuation or suction points which draw the resin into the moulding towards the resin flow point, or by resin supply lines which press the resin into the moulding. Preferably, the resin flow points are evacuation or suction points for drawing air and/or resin out of the moulding. The flow points may be activatable to allow the resin to flow into the assembly when desired.

In a preferred embodiment, in step e), the first resin flow point is activated to infuse one part of the assembly whilst the second resin flow point is deactivated, followed by activation of the second resin flow point to infuse the complete assembly. The first resin flow point may be deactivated, when the second resin flow point is activated. Also, the resin flow points may be activated and/or deactivated upon the resin reaching a desired location in the assembly.

In another embodiment, the assembly may comprise a load carrying core structure, the core structure comprising apertures to enable visual identification of the location of the resin in the assembly.

The present invention will now be described by way of the following examples and figures, to which it should however not be limited.

Figure 2:
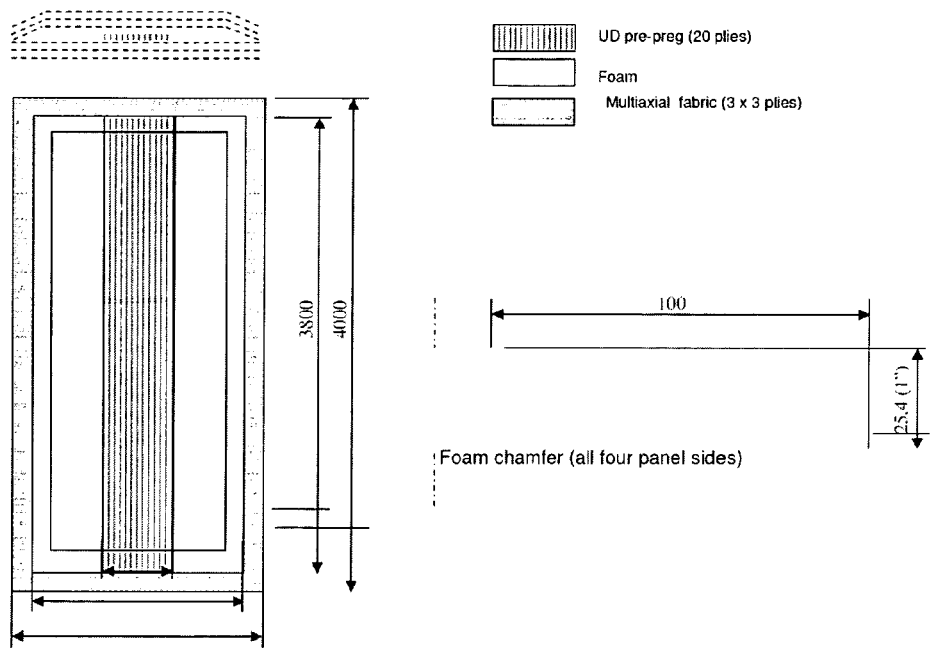

In FIG. 1, the respective reference numbers have the following meaning:
1) Scrimp net,
2) Peel Ply,
3) Layers of biaxial glass fabric
4) Foam structure
5) Layers of biaxial glass fabric
6) Inlet channel
7) Outlet channel
8) Layers of UD prepreg FIG. 2 shows a diagrammatic view of a moulding comprising 20 plies of a UD prepreg, foam and a multiaxial fabric (3×3 plies) in accordance with another embodiment of the invention.

Figure 3:
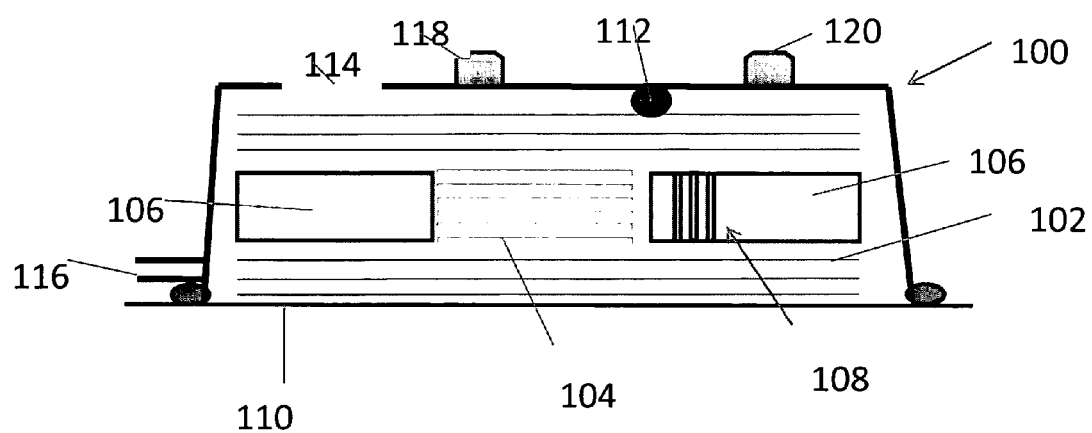

FIG. 3 presents a diagrammatic view of a moulding according to another embodiment of the invention.

EXAMPLE 1

A composite part measuring 4 meters in length and 1.9 meters in width was made from the present invention according to the following procedure and as schematically shown in FIGS. 1 and 2.

To a suitably treated layup table two layers of 800 gsm biaxial glass fabric (e.g. Saertex S32EX021-00820-01270-250000) were placed followed by a layer of interlaminar flow medium (e.g. Aerovac X.Fuse-CS200) of 500-600 mm width along the centre line of the length of the biaxial fabric. A further layer of biaxial glass fabric was then placed over the existing layers. More than one piece of biaxial glass fabric was used for each layer to achieve the desired width of 1900 mm by allowing for an overlap of 50 mm for adjacent pieces of fabric.

Along the centre line of the length of the existing assembly were placed 20 plies of unidirectional prepreg (e.g. Hexply M9.6F/32%/1600+50/G) of 440 mm width and between 4000 mm and 3800 mm in length such that the glass fleece portion of the prepreg faced down towards the existing plies of biaxial glass fabric. The longest piece of prepreg was placed first (e.g. 4000 mm) followed by progressively shorter lengths (e.g. down to 3800 mm) such that a chamfer was achieved at either end of the length of the prepreg stack.

Butted to both lengthwise sides of this prepreg stack were placed foam core (e.g. DIAB Inc. Divinylcell H80) measuring 550 mm in width and 4000 mm in length and cut to the same height as the prepreg stack and such that the outer edges of the core pieces when placed were chamfered. In the cross section according to FIG. 1 only the foam core of the right hand side is shown.

A further three layers of the same biaxial fabric totalling 1900 mm in width and 4000 mm in length were placed over the top of the existing material to achieve the total assembly of the invention.

The assembly was then prepared for infusion by applying over the entire assembly a layer of peel ply, a perforated release foil and infusion net before placing the necessary vacuum and resin channels followed by a suitable vacuum bag fitted with a vacuum port and two resin ports. The resin ports were connected to a mixture of low viscosity infusion resin and hardener (e.g. 100 parts by weight of Hexion Epikote MGS RIM 135 resin and 30 parts by weight of Hexion RIMH 137 hardener)

Air was then evacuated from the assembly by applying a vacuum. Once the desired level of vacuum was achieved the first resin port was opened to allow the resin to infuse in to the assembly at ambient temperature. After 14 minutes, the second resin port was opened to allow for further infusion. The assembly was completely infused after 22 minutes after which a total of 35 kg of infusion resin and hardener were consumed. The assembly was then covered with insulation material and the assembly was set to cure at 90° C.

EXAMPLE 2

A further composite part measuring 4 meters in length and 1.9 meters in width was made from the present invention according to the following procedure and schematically shown in FIGS. 1 and 2.

To a suitably treated layup table two layers of 800 gsm biaxial glass fabric (e.g. Saertex S32EX021-00820-01270-250000) were placed followed by a layer of interlaminar flow medium (e.g. Aerovac X.Fuse-CS200) of 500 mm width along the centre line of the length of the biaxial fabric. A further layer of biaxial glass fabric was then placed over the existing layers. More than one piece of biaxial glass fabric was used for each layer to achieve the desired width of 1900 mm by allowing for an overlap of 50 mm for adjacent pieces of fabric.

Along the centre line of the length of the existing assembly were placed 20 plies of unidirectional low tack prepreg (e.g. Hexply M9.6LT/32%/1600/G) of 440 mm width and between 4000 mm and 3800 mm in length. The longest piece of prepreg was placed first (e.g. 4000 mm) followed by progressively shorter lengths (e.g. down to 3800 mm) such that a chamfer was achieved at either end of the length of the prepreg stack.

To both lengthwise sides of this prepreg stack were placed foam core (e.g. DIAB Inc. Divinylcell H60) measuring 550 mm in width and 4000 mm in length and cut to the same height as the prepreg stack and such that the outer edges of the core pieces when placed were chamfered. In the cross section according to FIG. 1 only the foam core of the right hand side is shown.

A further three layers of the same biaxial fabric totalling 1900 mm in width and 4000 mm in length were placed over the top of the existing material to achieve the total assembly of the invention.

The assembly was then prepared for infusion applying over the entire assembly a layer of peel ply, a perforated release foil and infusion net before placing the necessary vacuum and resin channels followed by the a suitable vacuum bag fitted with a vacuum port and two resin ports. The resin ports were connected to a mixture of low viscosity infusion resin and hardener (e.g. 100 parts by weight of Hexion Epikote MGS RIM 135 resin and 30 parts by weight of Hexion RIMH 137 hardener)

Air was then evacuated from the assembly by applying a vacuum. Once the desired level of vacuum was achieved the first resin port was partially opened to allow the resin to infuse in to the assembly at ambient temperature. After 15 minutes, the second resin port was partially opened to allow for further infusion. After 21 minutes the second resin port was fully opened and the assembly was completely infused after 27 minutes and 31 kg of infusion resin and hardener were consumed. The assembly was then covered with insulation material and the assembly was set to cure at 90° C.

A part of similar size as in the above examples was produced using LRI and dry fibre only and was found to take over 45 minutes to infuse with the resultant laminate quality being poor. Attempts to decrease the infusion time proved difficult due to the limited number of resin inlet ports that could be used whilst attempts to improve laminate quality by increasing the infusion time failed due to the reactive resin mixture reaching an unacceptably high viscosity before complete infusion of the part could be achieved.

From the above examples it is clear that according to the present invention a number of benefits over the state of the art can be reached. When using LRI it would be necessary to have two separate process steps (one for lay up, infusion and curing the thick load bearing spar section and one for lay up, infusion and curing of the shell sections with the cured load bearing spar in-situ) which is time consuming and necessitates extra space for storing the load bearing spar stack during curing. According to the processes of the state of the art, the load bearing structure in the core of the composite part would include stitched dry fibre material with all the disadvantages mentioned, for instance lack of control of the tension of rovings, tows or plies leading to misalignment, wrinkles, folds and a reduction of mechanical properties. Furthermore, using stitched dry fibre material in the load bearing structure in the core of the composite part results in difficulties with regard to the control of the resin content of the load bearing structure, especially with thick stacks of dry fibre material it is difficult and time consuming to get full impregnation of the core load bearing structure with the respective resin material. Bad impregnation, i.e. areas of dry fibres in the finished load bearing structure may be repaired, however, such repair is both difficult and expensive. Lastly, the infusion time will also be long when thick stacks of dry fibre material are used in the core load bearing structure.

According to the present invention only one process step is necessary, which step combines infusion and curing of the outer structure with curing of the inner prepreg structure. The core load bearing structure consists of stacks of UD prepreg material without any stitching, by which relatively stiff and tacky prepreg material misalignment, wrinkles and folds within the stacks can easily be avoided and mechanical properties be maintained. Naturally, also resin control is easy because it is not necessary to bring the resin material with even distribution into the core stack, in the prepreg the resin material is already present and evenly distributed. Lastly, the process of the present invention is also faster with regard to infusion time since less resin is required, which resin also only has to infuse the outer structure of the assembly, not the core load bearing structure.

FIG. 3 illustrates a process for the production of a fibre-reinforced composite moulding assembly 100. The moulding assembly consists of layers of dry fibrous reinforcing material 102, placed on a mould surface 110 to form at least part of the outer structure. A plurality of prepreg layers 104 impregnated with a second resin material are located on the outer structure. The prepreg layers 104 are covered with fibrous reinforcing material 102 to finish the outer structure. The assembly or build up or moulding 100 further comprises a core material 106 which is located on either side of the prepreg layers 104. The core material 106 is largely impermeable to the resin and does not allow resin to flow through the material 106. The core material 106 comprises apertures 108 on one side of the prepreg. The core material may be formed by any suitable material such as foam (for example Divinycell™ as supplied by Diab Europe) or wood.

The assembly 100 is located inside a sealed evacuation chamber in the form of a vacuum bag 114. The moulding assembly 100 further includes a resin supply line 116 for supplying resin to the moulding, two resin flow points in the form of evacuation or suction points 118, 120 and a resin flow restriction in the form of a tape 112 which can prevent the flow of resin.

In use, a reduced pressure is applied to the assembly 100. This causes the vacuum bag to contract thereby pressing the tape 112 onto the outer structure which causes a resin flow restriction. The assembly 100 is infused, by activating the first resin flow point 118. This causes the resin to infuse the outer structure, both above and below the prepreg layers 104. When it is observed that the resin has flown through the apertures 108, the second resin flow point 120 is also activated which causes the resin to completely infuse the outer structure of the assembly 100. At this stage, the first resin flow point 118 may be deactivated. Once infusion is complete, the first and the second resin material are cured simultaneously. This then results in the cured moulding comprising both prepreg materials and resin infused fibrous materials.

The moulding and process as herein described are particularly suitable for the manufacture of blades such as wind turbine blades, in particular the outer surface or shell of the blade. In a further embodiment, there is thus provided a wind turbine and a blade manufactured by the process as described herein.

The invention claimed is:

1. A process for the production of a fibre-reinforced composite moulding, comprising the following steps:
 a) providing a build up comprising:
  1) a prepreg comprising fibrous reinforcement and a second resin, said prepreg having a top side, bottom side, left side and right side;
  2) a first core located on the left side of said prepreg, said core being resin impermeable and having an inner side located adjacent to said prepreg, an outer side, an upper side and a bottom side;
  3) a second core located on the right side of said prepreg, said core being resin impermeable and having an inner side located adjacent to said prepreg, an outer side, an upper side and a bottom side, said second core comprising a resin flow aperture that extends from the bottom side of said second core to the top side of said second core;
  4) a lower layer comprising a dry fibrous reinforcement material, said lower layer having a left side, a right side, a top side and a bottom side, wherein the top side of said lower layer of dry fibrous reinforcement material is adjacent to and located over the bottom sides of said prepreg, said first core and said second core;
  5) an upper layer comprising a dry fibrous reinforcement material, said upper layer having a left side, a right side, a top side and a bottom side, wherein the bottom side of said upper layer of div fibrous reinforcement material is adjacent to and located over the top sides of said prepreg, said first core and said second core;
 b) providing an evacuation chamber in which said build up is located, said evacuation chamber comprising:
  1) a resin inlet port located nearest to the left side of said lower layer of dry fibrous reinforcement material and said first core;
  2) a first outlet port located nearest to the upper side of said first core, said first outlet port being operable between an open position and a closed position;
  3) is second outlet port located nearest to the upper side of said second core, said second outlet port being operable between an open position and closed position;
 c) applying a vacuum to said evacuation chamber;
 d) introducing a first resin into said evacuation chamber through said resin inlet port with said first outlet port being in the open position and said second outlet port being in the closed position;
 e) operating said second outlet port to said open position when said first resin has traveled through said resin flow aperture; and
 f) curing said first and second resins to form said fibre-reinforced composite moulding.

2. The process according to claim 1 wherein the first resin and the second resin are cured or part cured simultaneously.

3. The process according to claim 1 wherein the flow of resin across the top side of said upper layer is restricted at a location between said first outlet port and said second outlet port.

4. The process according to claim 1 wherein said first outlet port is operated to said closed position when said second outlet port is operated to said open position.

5. The process according to claim 1 wherein the fibrous reinforcement of said prepreg comprises unidirectional fibers.

6. The process according to claim 1 wherein said lower layer comprises an interlaminar flow medium.

7. The process according to claim 1 wherein said lower layer and said upper layer comprise a biaxial glass fabric.

8. The process according to claim 7 wherein said lower layer comprises interlaminar flow material.

9. The process according to claim 5 wherein said lower layer and said upper layer comprise a biaxial glass fabric.

10. The process according to claim 9 wherein said lower layer comprises an interlaminar flow material.

11. The process according to claim 1 wherein said first core and said second core comprise foam.

12. The process according to claim 11 wherein said fibre-reinforced composite moulding is a wind turbine blade.

13. The process according to claim 11 wherein the fibrous reinforcement of said prepreg comprises unidirectional fibers.

14. The process according to claim 13 wherein said fibre-reinforced composite moulding is a wind turbine blade.

15. The process according to claim 13 wherein said lower layer and said upper layer comprise a biaxial glass fabric.

16. The process according to claim 15 wherein said fibre-reinforced composite moulding is a wind turbine blade.

17. The process according to claim 15 wherein said lower layer comprises an interlaminar flow material.

18. The process according to claim 17 wherein said fibre-reinforced composite moulding is a wind turbine blade.

19. The process according to claim 1 wherein the viscosity of said first resin material is between 0.14 and 0.4 Pa·s and the viscosity of said second resin material is between $0.7 \cdot 10^4$ and $8 \cdot 10^5$ Pa·s, both measured at 25° C.

20. The process according to claim 1 wherein said fibre-reinforced composite moulding is a wind turbine blade.

* * * * *

UNITED STATES PATENT AND TRADEMARK OFFICE
CERTIFICATE OF CORRECTION

PATENT NO. : 9,132,591 B2
APPLICATION NO. : 13/807051
DATED : September 15, 2015
INVENTOR(S) : Yara Millaray Borja Adasme et al.

It is certified that error appears in the above-identified patent and that said Letters Patent is hereby corrected as shown below:

Item (12) on the title page, "Adamse et al." should be "Borja Adasme et al."; and in line 1 Item (75) on the title page, "Adamse" should be "Adasme".

Signed and Sealed this
Fifth Day of July, 2016

Michelle K. Lee
*Director of the United States Patent and Trademark Office*